US007399962B2

(12) United States Patent
Makarov

(10) Patent No.: US 7,399,962 B2
(45) Date of Patent: Jul. 15, 2008

(54) ALL-MASS MS/MS METHOD AND APPARATUS

(75) Inventor: Alexander Makarov, Cheadle Hulme (GB)

(73) Assignee: Thermo Finnigan LLC, San Jose, CA (US)

( * ) Notice: Subject to any disclaimer, the term of this patent is extended or adjusted under 35 U.S.C. 154(b) by 420 days.

(21) Appl. No.: 10/558,184

(22) PCT Filed: May 28, 2004

(86) PCT No.: PCT/GB2004/002289

§ 371 (c)(1), (2), (4) Date: Nov. 22, 2005

(87) PCT Pub. No.: WO2004/107388

PCT Pub. Date: Dec. 9, 2004

(65) Prior Publication Data

US 2007/0023629 A1 Feb. 1, 2007

(30) Foreign Application Priority Data

May 30, 2003 (GB) ................................ 0312447.6

(51) Int. Cl.
*H01J 49/00* (2006.01)
*B01D 59/44* (2006.01)

(52) U.S. Cl. ...................................... 250/294; 250/282

(58) Field of Classification Search ....................... None
See application file for complete search history.

(56) References Cited

U.S. PATENT DOCUMENTS 5,734,162 A * 3/1998 Dowell ....................... 250/292
6,759,652 B2 * 7/2004 Yoshinari et al. ............ 250/292
6,977,373 B2 * 12/2005 Yoshinari et al. ............ 250/292
7,166,835 B2 * 1/2007 Baba et al. .................. 250/281
7,208,728 B2 * 4/2007 Hashimoto et al. .......... 250/287
7,227,137 B2 * 6/2007 Londry et al. ............... 250/292
7,288,761 B2 * 10/2007 Collings ..................... 250/292

FOREIGN PATENT DOCUMENTS

GB 2 378 312 A 2/2003

OTHER PUBLICATIONS

Hardman et al., "Interfacing the Orbitrap Mass Analyzer to an Electrospray Ion Source," Analytical Chemistry, vol. 75, ( No. 7), p. 1699-1705, (Apr. 1, 2003).
Hoaglund-Hyzer et al., "Mobility Labeling for Parallel CID of Ion Mixtures," Analytical Chemistry, vol. 72 ( No. 13), p. 2737-2740, (Jul. 1, 2000).

(Continued)

*Primary Examiner*—David A. Vanore
(74) *Attorney, Agent, or Firm*—Charles B. Katz

(57) ABSTRACT

A method of obtaining a mass spectrum of elements in a sample is disclosed. Sample precursor ions having a mass to charge ratio M/Z are generated, and fragmented at a dissociation site, so as to produce fragment ions of mass to charge ratio m/z. The fragment ions are guided into an ion trap of the electrostatic or "Orbitrap" type, the fragment ions entering the trap in groups dependent upon the precursor ions M/Z. The mass to charge ratio of each group is determined from the axial movement of ions in the trap. The electric field in the trap is distorted. Ions of the same m/z, that are derived from different pre-cursor ions, are then separated, because the electric field distortion causes the axial movement to become dependent upon factors other than m/z alone.

15 Claims, 7 Drawing Sheets

OTHER PUBLICATIONS

Marshall et al., "Two-Dimensional Fourier Transform Ion Cyclotron Resonance Mass Spectrometry/Mass Spectrometry with Stored-Waveform Ion Radius Modulation," J. Am. Chem. Soc., vol. 115 ( No. 17), p. 7854-7861, (Aug. 25, 1993).

* cited by examiner

ALL-MASS MS/MS METHOD AND APPARATUS

FIELD OF THE INVENTION

This invention relates to a method and apparatus of mass spectrometry, and in particular all-mass MS/MS using Fourier Transform electrostatic ion traps.

BACKGROUND OF THE INVENTION

Tandem mass spectrometry, or MS/MS, is a well known technique used to improve a spectrometer's signal-to-noise ratio and which can provide the ability to unambiguously identify analyte ions. Whilst the signal intensity may be reduced in MS/MS (when compared with single stage MS techniques), the reduction in noise level is much greater.

Tandem mass spectrometers have been used to analyse a wide range of materials, including organic substances such as pharmaceutical compounds, environment compounds and biomolecules. They are particularly useful, for example, for DNA and protein sequencing. In such applications there is an ever increasing desire for improving the analysis time. At present, liquid chromatography separation methods can be used to obtain mass spectra of samples. LC techniques often require the use of "peak-parking" to obtain full spectral information and there is a general consensus among persons skilled in the art that the acquisition time needed to obtain complete information about all peaks in a mass spectrum adds a significant time burden to research programs. Thus, there is a desire to move to higher throughput MS/MS.

Structure elucidation of ionised molecules can be carried out using tandem mass spectrometry, where a precursor ion is selected at a first stage of analysis or in a first mass analyser (MS1). This precursor ion is subjected to fragmentation, typically in a collision cell, and fragment ions are analysed in a second stage analyser (MS2). This widely used fragmentation method is known as collision induced dissociation (CID). However, other suitable dissociation methods include surface induced dissociation (SID), photo-induced dissociation (PID) or metastable decay.

Presently, there are several types of tandem mass spectrometer geometries known in the art in various geometric arrangements, including sequential in space, sequential in time, and sequential in time and space.

Known sequential in space geometries include magnetic sector hybrids, of which some known systems are disclosed in Tandem Mass Spectrometry edited by W F McLafferty and published by Wiley Inter-Science, New York, 1983; quadrupole time-of-flight (TOF) spectrometer described by Maurice et al in Rapid Communications in Mass Spectrometry, 10 (1996) 889-896; or TOF-TOF described in U.S. Pat. No. 5,464,985. As described in Hoagland-Hyzer's paper, Analytical Chemistry 72 (2000) 2734-2740, the first TOF analyser could be replaced by a separation device based on a different principle of ion mobility. The relatively slow time-scale of precursor ion separation in an ion mobility spectrometer allows the acquisition of a number of TOF spectra over each scan. If fragmentation means are provided between the ion mobility spectrometer and the TOF detector, then all-mass MS/MS becomes possible, albeit with very low precursor ion resolution.

Sequential in time mass spectrometers include ion traps, such as the Paul trap described by March et al in Quadrupole Storage Mass Spectrometry published by John Wiley, Chichester, 1989; or FTICR spectrometers as described by A G Marshall et al, Optical and Mass Spectrometry, Elsevier, Amsterdam 1990; or LT Spectrometers such as the one disclosed in U.S. Pat. No. 5,420,425.

Known sequential in time and space spectrometers include 3D trap-TOF (such as the one disclosed in WO 99/39368 where the TOF is used only for high mass accuracy and acquisition of all the fragments at once); FT-ICR such as the spectrometer disclosed by Belov et al in Analytical Chemistry, volume 73, number 2, Jan. 15, 2001, page 253 (which is limited by the slow acquisition time of the MS2); or LT-TOF spectrometers, (for example as disclosed in U.S. Pat. No. 6,011,259, which transmits only one precursor ion but which the inventors claim to have achieved a 100% duty cycle).

All of these existing mass spectrometers are only able to provide sequential analysis of MS/MS spectra, that is, one precursor mass at a time. Put another way, it is not possible to provide an all-mass spectra for all precursor masses in a single analysis using these existing mass spectrometers. Insufficient dynamic range and acquisition speed of MS-2 mass spectrometers are considered to be a limiting factor in the spectrometer's ability.

This dynamic range and acquisition speed problem has been partially addressed for Fourier Transform ion cyclotron resonance (FTICR) mass spectrometers, as described in Analytical Chemistry, 1990, 62, 698-703 (Williams E R et al) and in the Journal of the American Chemical Society, 115 (1993) 7854, Ross C W et al. Two different multiplex approaches have been demonstrated which take advantage of a multichannel arrangement. These are as follows:

Two Dimensional Hadamard/FTICR Mass Spectrometry

In this method, a sequence of linearly independent combinations of precursor ions are selected for fragmentation to yield a combination of fragment mass spectra. Encoding/decoding of the acquired "masked" spectra is provided by Hadamard transform algorithms. Williams E R et al (referred to above) have shown that for N different precursor ions, a given signal to noise ratio could be achieved in experiments having a reduced spectra acquisition time of N/4-fold.

Two Dimensional Fourier/FTICR Mass Spectrometry

This method uses an excitation waveform to excite all the precursor ions. This provides different excitation states for different masses of precursor ions. Using stored waveform inverse Fourier Transform (SWIFT) methods, the excitation waveform is a sinusoidal function of precursor ion frequency, with the frequency of the sinusoidal function increasing from one acquisition to another. As a result, the intensities of fragment ions for a particular precursor ion are also modulated according to the applied excitation. Inverse 2D Fourier Transform applied to a set of transients results in a 2D map which unequivocally relates fragment ions to their precursors.

According to Marshall A G (referred to above) the first method requires substantially less data storage and the second method requires no prior knowledge of the precursor ion spectrum. However, in practical terms, both methods are not compatible with commonly used separation techniques, for instance HPLC or CE. This is due to the relatively low speed of FTICR acquisition (which is presently no faster than a few spectra per second), and a relatively large number of spectra required. Also, unless the LC separation method is artificially "paused" using relatively cumbersome "peak parking" methods, the analyte can exhibit significant intensity changes within a few seconds (in the most widely used separation methods). Further, the use of peak parking methods can greatly increase the time to acquire spectra.

GB-A-2,378,312 and WO-A-02/078046 describes a mass spectrometer method and apparatus using an electrostatic trap. A brief description is provided of some MS/MS modes available for this arrangement. However, it does not address any problems associated with all-mass MS/MS analysis in the trap. The precursor ions are ejected from a storage quadrupole, and focussed into a coherent packet by TOF focussing so that the ions having the same m/z enter the electrostatic trap at substantially the same moment in time.

The trajectories of ions in an electrostatic trap are described by Makarov in "Electrostatic Axially Harmonic Orbital Trapping: A High Performance Technique of Mass Analysis", Journal of Analytical Chemistry, v. 72, p 1156-1162 (2000). From the equations of motion presented in Makarov's paper, it follows that the axial frequency is independent of the energy and the position of ions in the trap (or phase of ions as they enter to trap). Thus, the axial frequency of ion motion is used for mass analysis.

SUMMARY OF THE INVENTION

The present invention provides a method of mass spectrometry using an ion trap, the method comprising: a) generating a plurality of precursor ions from a sample, each ion having a mass to charge ratio selected from a first finite range of mass to charge ratios $M_1/Z_1$, $M_2/Z_2$, $M_2/Z_3 \ldots M_N/Z_N$; b) causing at least some of the plurality of precursor ions to dissociate, so as to generate a plurality of fragment ions, each of which has a mass to charge ratio selected from a second finite range of mass to charge ratios $m_1/z_1$, $m_2/z_2$, $m_3/z_3 \ldots m_n/z_n$; c) directing the fragment ions into an ion trap, the ion trap including means for generating an electromagnetic field which allows trapping of ions in at least one direction thereof, the ions entering the trap in groups at a time which depends upon the mass to charge ratio of the precursor ions; d) determining the mass to charge ratio of ions in at least one of the groups of ions, based upon a parameter of motion of the ions in that or those groups in the said electromagnetic field in the trap; and e) distorting the electromagnetic field in the trap so as to permit separate detection of fragment ions within the trap which have the same mass to charge ratio, but which are derived from different precursor ions.

Preferably, the trap is an electrostatic trap. Advantageously, the method can distinguish two or more fragmented ion groups having the same mass to charge ratio m/z, each being derived from different precursor ion groups with different $M_1/Z_1$, $M_2/Z_2$ etc, from one another when the electric field is distorted. The distortion causes the frequency of (axial) oscillation of one ion group to change relative to the other ion group. Thus, where the two ion groups were previous undistinguishable from one another, their change of axial frequency relative to each other now renders them distinguishable. The location might be either the location of ion formation (for instance, if MALDI ion sources are used), or the location at which ions are released from intermediate storage in an RF trapping device, for example.

It is possible to "label" each ion group derived from different precursor ions because any one of the parameters (e.g. amplitude of movement of each group in the electrostatic trap, or ion energy in each group, or the initial phase of oscillation of each group in the electrostatic trap) is dependent on T, in the electrostatic trap (where T is the TOF of an ion from its place of release to the electrostatic trap entrance), and T is in turn dependent on the mass to charge ratio of the precursor and/or fragment ions.

The method has further advantages of being able to acquire a full spectrum for each of the many precursor ions in one individual spectrum, if for example, detection is performed in the electrostatic field using image current detection methods.

Determination of the differences of movement amplitude and energies for each of the fragmented ion groups can be achieved by distorting the electric field in the electrostatic trap. In this way, the axial frequency of trajectories for each of the fragment ions (having the same mass to charge ratio $m_1/z_1$) in the trap is no longer independent of ion parameters.

Preferably the electric field is distorted locally by applying a voltage to an electrode. The electric field distortion can be arranged such that the axial oscillation frequency of a fragmented ion relatively close to the distortion is different to the axial oscillation frequency of the other fragmented ion, relatively distant from the distortion. Thus, fragment ions with the same mass to charge ratio $m_1/z_1$, but being derived from precursor ions with different mass to charge ratios $M_1/Z_1$ and $M_2/Z_2$ can be distinguished from one another. A method for all-mass MS/MS is therefore achieved.

Embodiments of the present invention are capable of improving the speed of analysis by five to ten times, at least, compared to LC peak parking techniques.

The present invention also provides a mass spectrometer comprising: an ion source, arranged to supply a plurality of sample ions to be analysed; means for directing the sample ions towards a dissociation location, the sample ions arriving at the said dissociation location as a plurality of groups of precursor ions in accordance with their mass to charge ratios selected from the range $M_1/Z_1$, $M_2/Z_2$, $M_3/Z_3 \ldots M_N/Z_N$; an ion trap having a trap entrance, the ion trap being arranged to receive groups of fragment ions generated by dissociation of the precursor ions at the dissociation location, each group of fragment ions having a mass to charge ratio selected from the range $m_1/z_1$, $m_2/z_2$, $m_3/z_3 \ldots m_n/z_n$, the ion trap further comprising trap electrodes configured to generate a trapping field within the ion trap, so that unfragmented precursor ions and/or fragment ions entering the trap are trapped in at least one axial direction thereof by the said trapping field and have a parameter of movement related solely to the mass to charge ratio of the ion; detection means to permit determination of the mass to charge ratio of an ion group based upon the said parameter of movement; and at least on electric field distorting electrode arranged to provide a distortion of the trapping field so as to permit the detection means to detect separate groups of fragment ions in the ion trap which have the same mass to charge ratio, $m_1/z_1$, but which have derived from precursor ions having at least two different mass to charge ratios $M_1/Z_1$, $M_2/Z_2$.

BRIEF DESCRIPTION OF THE DRAWINGS

The present invention is now described by way of example, and with reference to the following drawings, in which.

We have realised that Fourier Transform mass spectrometers have the potential for acquiring an MS/MS spectrum from multiple precursor ions in a single scan, which can greatly reduce the time burden on acquiring a spectrum to a level at least comparable with, or better than LC.

The present invention is described with reference to an electrostatic trap according to the trap disclosed in GB-A-2,378,312, WO-A-96/30930 and Makarov's paper (referred to previously) and these documents are hereby incorporated by reference. Reference is made to this trap throughout the description as an "orbitrap". Of course, other arrangements of electrostatic traps can be used and this invention is not limited to use with the specific embodiment disclosed herein and in these references. Other electrostatic traps might include arrangements of multi-reflecting mirrors of planar, circular, elliptical, or other cross-section. In other words, the present invention could be applied to any electrode structure sustained at high vacuum which provides multiple reflections and isochronous ion motion in at least one direction. It is not necessary to describe the orbitrap in great detail in this document and reference is made to the documents cited above in this paragraph. The present invention may also, in principle, be applied to a traditional FTICR, although this would require development of sophisticated ion injection and excitation techniques. For example, some electrodes of the FTICR cell, particularly the detection electrodes, could be energised to provide controlled field perturbation.

Preferably, for accurate detection to take place, the orbitrap requires ions to be injected into the trap with sufficient coherence to prevent smearing of the ion signal. Thus, it is necessary to ensure that groups of ions of a given mass to charge ratio arrive as a tightly focussed bunch at, or adjacent to, the electrostatic trap entrance. Such bunches or packets are ideally suited for electrostatic traps, because the full width half maximum (FWHM) of each of the ion packet's TOF distribution (for a given mass to charge ratio) is less than the period of oscillation of sample ions having that mass to charge ratio when in the electrostatic trap. Reference is made to U.S. Pat. No. 5,886,346 and GB-A-2,378,312 which describes particular restrictions on the release potential and these two documents are hereby incorporated by reference. Alternatively, a pulsed ion source (for example using short laser pulses) can be employed with similar effect.

Figure 1:
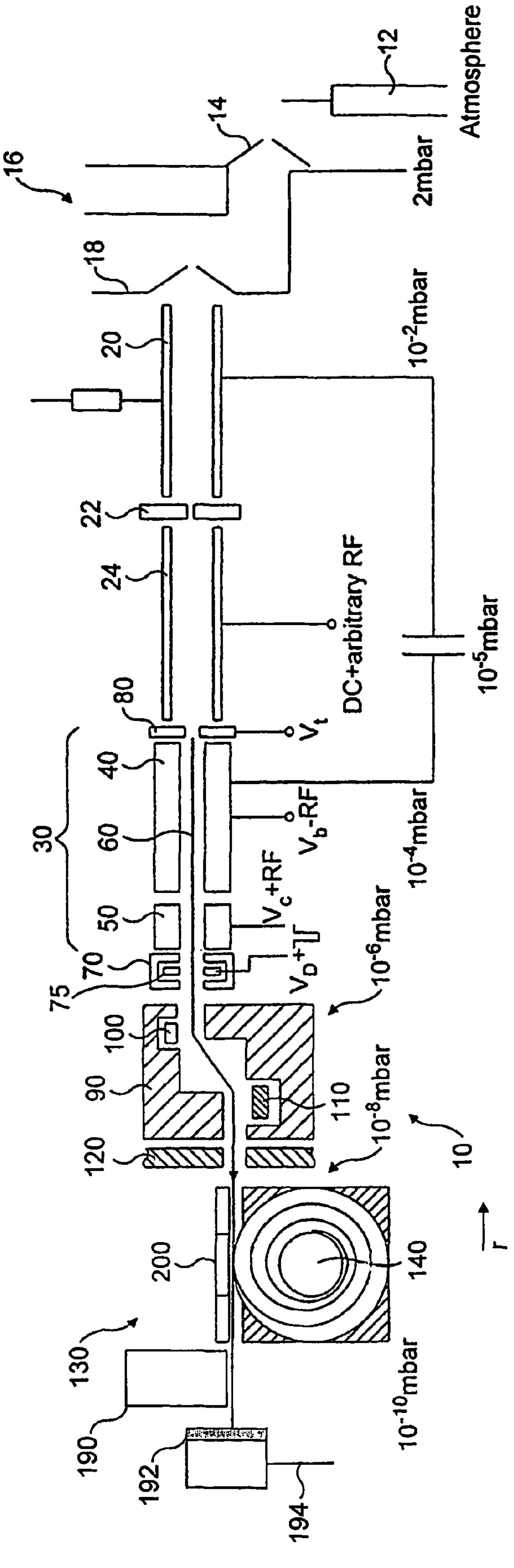
FIG. 1 is a schematic diagram of an apparatus used by the present invention.

Referring to FIG. 1, a mass spectrometer 10 is shown. The mass spectrometer comprises a continuous or pulsed ion source 12, such as an electron impact source, an electrospray source (with or without a Collision RF multipole), a matrix assisted laser desorption and ionization (MALDI) source, again with or without a Collision RF multipole, and so forth. In FIG. 1 an electrospray ion source 12 is shown.

Nebulised ions from the ion source 12 enter an ion source block 16 having an entrance cone 14 and an exit cone 18. As is described in WO-A-98/49710, the exit cone 18 has an entrance at 90° to the ion flow in the block 16 so that it acts as a skimmer to prevent streaming of ions into the subsequent mass analysis components.

A first component downstream of the exit cone 18 is a collisional multipole (or ion cooler) 20 which reduces the energy of the sample ions from the ion source 12. Cooled ions exit the collisional multipole 20 through an aperture 22 and arrive at a quadrupole mass filter 24 which is supplied with a DC voltage upon which is superimposed an arbitrary RF signal. This mass filter extracts only those ions within a window of mass to charge ratios of interest, and the chosen ions are then released into linear trap 30. The ion trap 30 is segmented, in the embodiment shown in FIG. 1, into an entrance segment 40 and an exit segment 50. Though only two segments are shown in FIG. 1 it is understood that three or more segments could be employed.

As is familiar to those skilled in the art, the linear trap 30 may also contain facilities for resonance or mass selective instability scans, to provide data dependant excitation, fragmentation or elimination of selected mass to charge ratios.

Ions are ejected from the trap 30. In accordance with a convention now defined, these ions, which are (as will be understood from the following) precursor ions, have one of a range of mass to charge ratios $M_A/Z_A$, $M_B/Z_B$, $M_C/Z_C$ . . . $M_N/Z_N$, where $M_N$ is mass and $Z_N$ is charge of an $N^{th}$ one of the range of M/Z ratios of the precursor ions.

Downstream of the exit electrode is a deflection lens arrangement 90 including deflectors 100, 110. The deflection lens arrangement is arranged to deflect the ions exiting trap 30 in such a way that there is no direct line of sight connecting the interior of the linear trap 30 with the interior of an electrostatic orbitrap 130, downstream of the deflection lens arrangement 90. Thus, streaming of gas molecules from the relatively high pressure linear trap into the relatively low pressure orbitrap 130 is prevented. The deflection lens arrangement 90 also acts as a differential pumping aperture. Downstream of the deflection lens arrangement is a conductivity restrictor 120. This sustains a pressure differential between the orbitrap 130 and the lens arrangement 90.

Ions exiting the deflection lens through the conductivity restrictor arrive at an SID surface 192, on the optical axis of the ion beam from the transfer lens arrangement 90. Here, the ions collide with the surface 192 and dissociate into fragment ions having a mass to charge ratio which will be in general different to that of the precursor ion. In keeping with the convention defined above for the precursor ions, the mass to charge ratio of the resultant fragment ions is one of $m_a/z_a$, $m_b/z_b$, $m_c/z_c$ . . . $m_n/z_n$, where $m_n$ and $z_n$ are the mass and charge of an $n^{th}$ one of the range of m/z ratios of the fragment ions.

Figure 2:
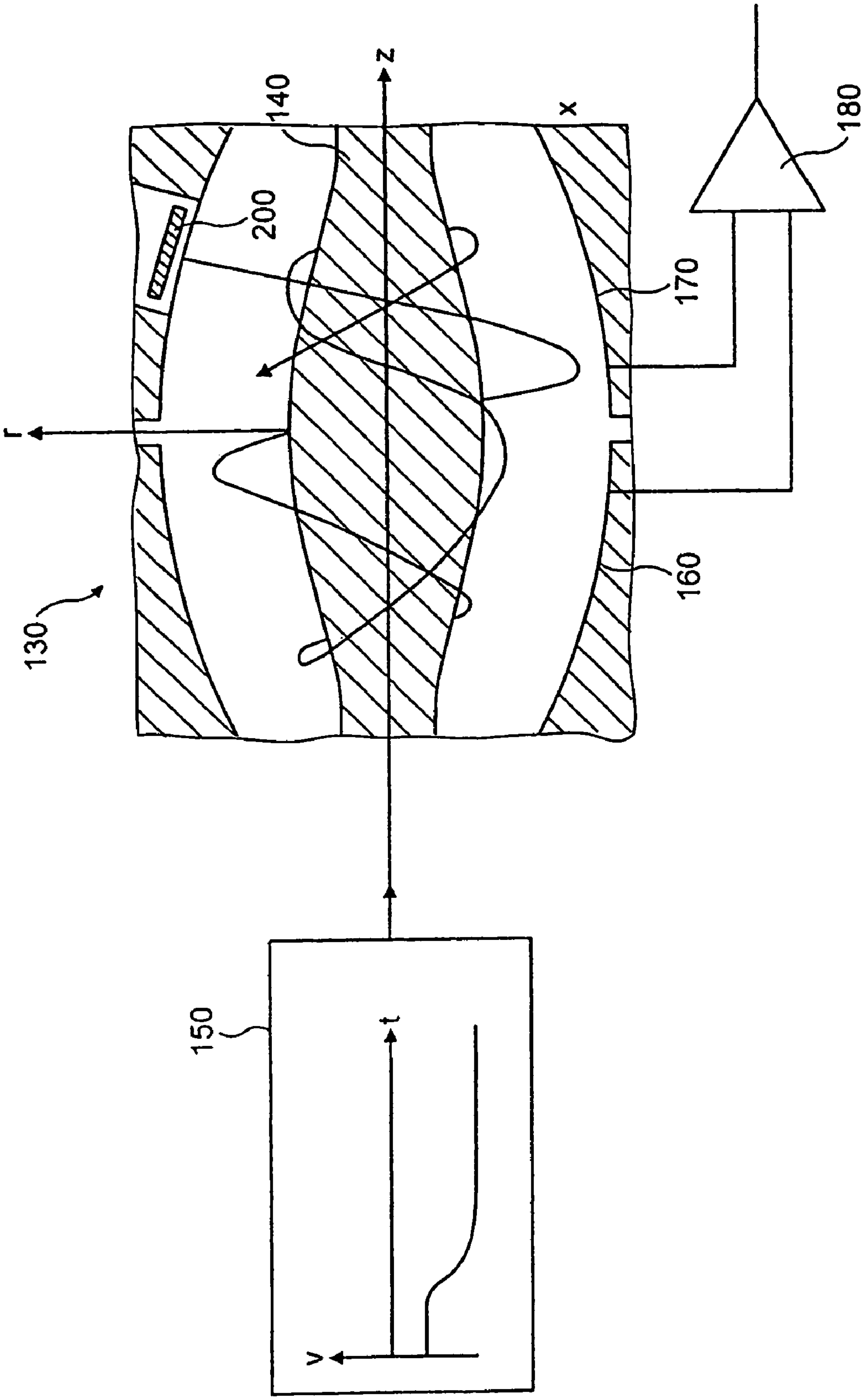
FIG. 2 is a schematic diagram showing details of the electrostatic trap shown in FIG. 1.

The fragment ions, and any remaining precursor ions are reflected from the surface and arrive at the orbitrap entrance. The orbitrap 130 has a central electrode 140 (as may be better seen with reference now to FIG. 2). The central electrode is connected to a high voltage amplifier 150.

The orbitrap also preferably contains an outer electrode split into two outer electrode parts 160, 170. Each of the two outer electrode parts is connected to a differential amplifier 180. Preferably this differential amplifier is maintained at virtual ground.

Referring once more to FIG. 1, downstream of the orbitrap is a secondary electron multiplier 190 located to the side of the orbitrap 130. Also shown in FIG. 1 is an SID surface voltage supply 194. In an alternative embodiment, a deceleration gap can be provided between a grid (placed in front of the CID surface) and the surface. Ions pass through the grid into the gap, where they experience a deceleration force caused by an offset voltage applied to the grid. In this way, the collision energy between the ions and the surface can be reduced in a controlled manner.

The system, and in particular the voltages supplied to the various parts of the system, is. controlled by a data acquisition system which does not form part of the present invention. Likewise, a vacuum envelope is also provided to allow differential pumping of the system. Again this is not shown in the figures although the typical pressures are indicated in FIG. 1.

The operation of the system, from ions leaving the ion source 12, entering the segmented linear trap 30, being released from the trap and deflected by the lens arrangement 90 are described in GB 0126764.0. The operation of the system up to release of the ions from a linear trap does not form part of the present invention. Accordingly no further detailed discussion of this aspect of the apparatus is necessary in this document.

The embodiment shown in FIG. 1 has the SID surface placed behind the trap, in a reflective geometry, so that ions pass through the orbitrap without being deflected into the trap entrance (there being no voltage applied to the deflection electrode 200 or electrode 140 at this stage). The ions interact with the collision surface 192, dissociating into fragment ions and are reflected back from the surface into the orbitrap. At this stage, a voltage is applied to the electrode 200 and the ions are deflected into the orbitrap.

The energy of the collisions with the surface (and also the energy spread on the resulting fragments) can be regulated by a retarding voltage 194 applied to the SID surface. The distance between the SID surface and the trap 130 is chosen with ion optical considerations in mind, as well as the required mass range. In the preferred embodiment the ions leave the ion trap 30 and are time of flight (TOF) focused onto the SID surface. As a result, the ions arrive at the SID surface in discrete bunches according to the mass to charge ratio; each bunch has ions of mass to charge ratio $M_A/Z_A$, $M_B/Z_B$, . . . $M_N/Z_N$, as defined above. There is no TOF focussing of the precursor or fragment ions from the SID surface into the orbitrap's entrance. The SID is located as close to the orbitrap's entrance as is practical so that any spreading or smearing of ions is minimised. The distance L between the SID site and the entrance is preferably between 50-100 mm. As a result, the additional broadening of an ion packet, dL, from the SID surface to the orbitrap's entrance is negligible, and typically less than 0.5 to 1 mm (as the energy distribution of fragment ions leaving the SID is 10-20 eV and the acceleration voltage is of the order of 1 keV). It is to be understood, of course, that this arrangement is merely a preferred embodiment and other forms of dissociation known in the art may also be used. The principles of reducing smearing by maintaining a short distance between the dissociation site and the orbitrap's entrance remain the same, whatever the form of dissociation.

The skilled artisan will appreciate that photo-induced dissociation (PID), using an impulse laser, may be employed. PID utilises the relatively high peak power of a pulsed laser to dissociate the precursor ions. The dissociation is preferably made in a region where the precursor ions have a lower kinetic energy so that the fragment ions have energies within the energy acceptance of the trap. Furthermore, collision induced dissociation (CID) can be carried out in a region of lower kinetic energy of precursor ions, preferably in a relatively short, high pressure collision cell. The cell should be arranged to avoid significant broadening of all the time-of-flight distributions from the linear trap 30. Thus, the time-of-flight of ions inside the CID cell is desirably less than, and more preferably, very much less, than both the TOF of ions from the linear trap to the cell, and from the cell to the orbitrap's entrance. At present, we believe that fragmentation by CID is the least preferable approach because of the inherently strict high vacuum limitations of electrostatic traps.

In the operation of the preferred embodiment, a pulse of precursor (or "parent") ions is released from the linear ion trap 30. The ions separate into discrete groups according to their times-of-flight during their transition from the storage quadrupole or sample plate to the dissociation site, the TOF separation in turn being related to the value, n, in the mass to charge ratio $M_N/Z_N$ as defined previously.

Each group, or packet of ions (which now comprises ions of substantially the same mass to charge ratio M/Z) collides with the dissociation site. Here, some precursor ions are fragmented into fragment ions with lower energy (in the order of several eV) than the precursor ions' energy. Fragmentation using SID is essentially an instantaneous process. Thus, the fragment ions are ejected from the dissociation site in groups or packets. These fragmented ion groups have differing TOFs from the dissociation site to the orbitrap entrance, according to their mass-to-charge ratios $m_n/z_n$. Each bunch of precursor ions of $M_N/Z_N$ may produce fragment ions of various mass to charge ratios $m_a/z_a$, $m_b/z_b$, . . . $m_n/z_n$. Some unfragmented ions of mass to charge ratio $M_A/Z_A$, $M_B/Z_B$, $M_C/Z_C$ . . . $M_N/Z_N$ may also remain. Hence, fragment ions and any remaining precursor ions are injected off axis into the increasing electric field of the orbitrap as coherent groups, depending on their mass-to-charge. Coherent packs of the precursor and fragment ions are thus formed in the orbitrap, with each pack having ions of the same mass to charge ratio $m_a/z_a$, $m_b/z_b$, $m_c/z_c$ . . . $m_n/z_n$; $M_A/Z_A$, $M_B/Z_B$, $M_C/Z_C$ . . . $M_N/Z_N$.

During ion injection a voltage 150, applied to the central electrode 140 of the orbitrap, is ramped. As explained in Makarov's paper (referenced above), this ramping voltage is utilised to "squeeze" ions closer to the central electrode and can increase the mass range of trapped ions. The time constant of this electric field increase is typically 20 to 100 microseconds, but depends on the mass range of the ions to be trapped.

During normal operation, the (ideal) electric field in the orbitrap is hyper-logarithmic, due to the shape of the central and outer electrodes. Such a field creates a potential well along the longitudinal axis direction which causes ion trapping in that potential well provided that the ion incident energy is not too great for the ion to escape. As the voltage applied to the centre of electrode 140 increases, the electric field intensity increases and therefore the force acting on the ions towards the longitudinal axis increases, thus decreasing the radius of spiral of the ions. As a result, the ions are forced to rotate in spirals of smaller radius as the sides of the potential well increase in gradient.

As discussed in the prior art, there are three characteristic frequencies of oscillation within the hyper-logarithmic field. The first is the harmonic motion of the ions in the axial direction where the ions oscillate in the potential well with a frequency independent of ion energy. The second characteristic frequency is oscillation in the radial direction since not all of the trajectories are circular. The third frequency characteristic of the trapped ions is the frequency of angular rotation. The moment T of an ion pack entering the orbitrap electric field is a function of the mass to charge ratio of the ions in it (i.e., in general, $m_n$/zn or $M_N/Z_N$) and is defined in equation 1 provided below:

$$T(m_n/z_n, M_N/Z_N) \approx t_o + TOF_1(M_N/Z_N) + TOF_2(M_N/Z_N) \cdot \sqrt{\frac{m_n/z_n}{M_N/Z_N}} \qquad (1)$$

where $t_o$ is the moment of ion formation or release from the trap; $TOF_1(M_N/Z_N)$ is the time-of-flight of precursor ions of mass to charge ratio $M_N/Z_N$ from the place of ion release or ion formation to the collision surface; $TOF_2(M_N/Z_N)$ is the time-of-flight of precursor ions of mass to charge ratio $M_N/Z_N$ (i.e. the same mass to charge ratio as the ions incident upon the collision surface but which have failed to dissociate), from the collision surface to the entrance to the orbitrap; and $m_n/z_n$ is the mass to charge ratio of fragment ions produced upon collision, from the precursor ions of mass to charge ratio $M_N/Z_N$. It will also be understood that equation 1 links precursor ions of one specific mass to charge ratio $M_N/Z_N$ to a single packet of fragment ions each having a mass to charge ratio $m_n/z_n$, although a similar equation may be applied to estimate the moment T' for fragment ions of mass to charge ratio $m_a/z_a$, for example, also deriving from the same precursor packet having $M_N/Z_N$ simply by substituting $m_a/z_a$ for $m_n/z_n$ in equation 1. Ions could also be generated from a solid or liquid surface using MALDI, fast atom bombardment (FAB), secondary ion bombardment (SIMS) or any other pulsed ionization method. In these cases, $t_0$ is the moment of ion formation. The effects of energy release, energy spread and other constants or variables are not included in equation 1 for clarity reasons.

There are parameters which are dependent on ion mass-to-charge ratio due to the separation of the ions into groups according to their TOF from the quadrupole trap. These parameters include the amplitude of movement during detection in the orbitrap (for example, radial or axial amplitudes), the ion energy during detection, and the initial phase of ion oscillations (which is dependent on T). Any of these parameters can be used to "label" the precursor or fragment ions.

It is preferable that the fragment ions are formed on a timescale such that TOF effects do not disrupt the fragmented ion package coherence to an extent which might affect detection (eg. because of smearing caused by energy spread). The parameters of the fragment ions may differ from those of the precursor ions. However, the fragment ions can be unequivocally related to their precursor ion's parameters. This is achieved in the following manner.

In a preferred embodiment, detection of the ion's axial oscillation frequencies in the trap starts at a predetermined detection time $T_{det}$ after $t_0$. $T_{det}$ is typically several tens of milliseconds (for instance 60 ms or more) after $t_0$ and the TOF of ions from the storage trap is typically 3 to 20 microseconds (for instance). The period $T_{axial}(m_n/z_n)$ of ion axial oscillations for fragment ions of mass to charge ratio $m_n/z_n$ is of the order of a few microseconds, depending on the value of $M_N/Z_N$ or $m_n/z_n$, of course. The phase of oscillations $P(m_n/z_n, M_N/Z_N)$ can therefore be determined using equation 2 below:

$$P(m_n/z_n, M_N/Z_N) = 2\pi \cdot \text{fraction}\left\{\frac{T_{det} - T(m_n/z_n, M_N/Z_N)}{T_{axial}(m_n/z_n)}\right\} + c \quad (2)$$

where P is the phase, c is a constant and fraction{ . . . } is a function that returns a fractional part of its argument.

According to the Marshall reference cited above, the detected phase, $P_{det}(\omega)$, can be deduced by detecting the adsorption and dispersion frequency spectra, $A(\omega)$ and $D(\omega)$ respectively as set out in equation 3 below:

$$P_{det}(\omega) = \arctan\left\{\frac{D(\omega)}{A(\omega)}\right\} \quad (3)$$

and using the relation between the axial frequency of motion of ions ω and $m_n/z_n$ for the orbitrap $$\omega(m_n/z_n) = \sqrt{k\cdot(m_n/z_n)} \quad (4)$$

where k is a constant derived from the orbitrap's electric field. The period of ion oscillations $T_{axial}(m_n/z_n)$ is linked to the axial frequency ω as $$T_{axial}(m_n/z_n) = \frac{2\pi}{\omega(m_n/z_n)} \quad (5)$$

Thus, for a given fragment ion mass to charge ratio $m_n/z_n$, and using constants derived from a preliminary system calibration, it is possible to deduce $M_N/Z_N$, the mass to charge ratio of the precursor ion from which the fragment ion of mass to charge ratio $m_n/z_n$ is derived from equations 1 to 4. In other words, $P(m_n/z_n, M_Z/Z_N)$ is deduced from the measured phase and $m_n/z_n$ (using equations 3 and 4) and from these values it is possible to deduce $T(m_n/z_n, M_N/Z_N)$ from equation 2. As a result, it is possible to deduce $M_N/Z_N$ from equation 1. Thus, the mass to charge ratio $M_N/Z_N$ of a precursor ion from which a fragment ion is derived can be unequivocally ascertained because the axial oscillation of the fragment ion is linked to the phase of the precursor ion oscillation in the orbitrap. This statement does, however, assume that $m_n/z_n$ of a given fragment ion can arise only from a single mass to charge ratio $M_N/Z_N$ of precursor ion, and not also from, say, $M_A/Z_A$ or other precursor mass to charge ratios.

The initial phase of oscillation of the precursor and fragment ions in the orbitrap is dependant on T which can be deduced from, for example, the real and imaginary parts of the Fourier Transform of the fragment ion's axial oscillation frequency. Alternatively, T can be measured directly using TOF spectra acquired by the electron multiplier 190. The mass to charge ratio $m_n/z_n$ could then be deduced using an appropriate calibration curve for the orbitrap. In this manner, all-mass MS/MS spectroscopy is achievable.

However, the situation can be more complicated if two (or more) precursor ion groups having different M/Z (say, $M_A/Z_A$ and $M_N/Z_N$ produce a plurality of fragment ion groups having the same m/z (say, $m_n/z_n$). In any case, if fragment ions of the same mass to ratio $m_n/z_n$, (but derived from different precursor ions with different mass to charge ratios $M_A/Z_A$, $M_B/Z_B$ . . . $M_N/Z_N$) enter the orbitrap at different moments in time, their axial oscillation frequencies are the same and so they are not otherwise distinguishable from each other. This is so because the ion's frequency of axial oscillations are independent of ion energy and initial phase of ion oscillation (i.e. it is only dependent on mass-to-charge ratio).

This situation can be exemplified as follows. Consider two groups of precursor ions with mass to charge ratios (say, $M_A/Z_A$ and $M_N/Z_N$) respectively are released from the ion storage at substantially the same time and where $M_A/Z_A$ is lower than $M_B/Z_B$ (mass $M_A$ is lighter than mass $M_B$). As normal, the ion with the lower mass-to-charge ratio moves faster than the heavier, following $$TOF(M/Z) \propto \sqrt{M/Z} \quad (5)$$

As a result, ions of mass to charge ratio $M_A/Z_A$ arrives at the SID surface earlier than ions of mass to charge ratio $M_B/Z_B$. Here, the ions of mass to charge ratio $M_A/Z_A$ promptly fragment, so that a fragment ion with mass to charge ratio $m_n/z_n$ is produced (along with other ions, of course). The specific ion under consideration, that is, the ion with mass to charge $m_n/z_n$, starts moving towards the orbitrap's entrance. If, for example, $m_n/z_n < M_A/Z_A$ (which is not always the case, for instance when $m_n < M_A$, but $z_n << Z_A$), then fragment ion $m_n/z_n$ overtakes any $M_A/Z_A$ precursor ions which did not fragment at the SID. Thus, according to equation 5 above, fragment ions with a mass to charge ratio of $m_n/z_n$ arrive at the orbitrap's entrance before the unfragmented precursor ions. The time difference of arrival at the entrance is governed by equation 1. It is possible that, while the group of ions of mass to charge ratio $M_A/Z_A$ are still in transit between the SID and the orbitrap's entrance, the ion group having a mass to charge ratio $M_B/Z_B$ arrive at the SID. Here they too fragment, forming (amongst others) a second group of ions with a mass to charge ratio of $m_n/z_n$, which proceed to move towards the orbitrap's entrance. As before, fragment ions in the group having mass to charge of $m_n/z_n$ are likely to "overtake" ions in the group having a mass to charge ratio $M_B/Z_B$ on their way to the orbitrap (assuming $m_n/z_n$). The second group of fragment ions $m_n/z_n$ arrive at the orbitrap's entrance after the first group of fragment ions of the same $m_n/z_n$ but deriving from the precursor ions of mass to charge ratio $M_A/Z_A$. As a result, the group of fragment ions (with mass to charge $m_n/z_n$) arriving at the orbitrap's entrance first, and derived from the precursor ions of mass to charge ratio $M_A/Z_A$ has a different phase to the later group of fragment ions with the same mass to charge ratio $m_n/z_n$ but derived from the other precursor ions of mass to charge ratio $M_B/Z_B$. (In extreme, and very unlikely, cases the phases of the two fragment ion groups can cancel one another out, resulting in no signal being detected).

If the electric field in the orbitrap is ideal (that is, perfectly hyperlogarithmic) then both groups give a single spectral reading for the same $m_n/z_n$, regardless of the identity of the precursor ions from which they derive, since (as explained previously), in an ideal hyperlogarithmic field, the axial frequency of motion which is detected is dependent only on $m_n/z_n$ which is the same for each group of fragment ions) and is not affected by any relative phase or energy difference between the two such groups This is undesirable since it is then difficult to attribute the detected fragment ions (with mass to charge ratio m/z), to one or other of a plurality of different precursor ions. Thus, this signal needs to be unscrambled.

This unscrambling can be achieved by initiating the ramping of the voltage 150 at a time before ions enter the trap, and to terminate the ramp at a time after all the ions of interest have entered the trap. As a result, a first group of fragment ions, that enter the trap at a earlier time than a second group of fragment ions, experience more of the ramped voltage than the second group, even for the same $m_n/z_n$. Thus, the first group of ions are "squeezed" closer to the central electrode than the second group. As a result, the amplitude of oscillation is therefore greater for the second group than the first group. The first and second groups of fragment ions thus have distinctly different orbital radii about the central electrode.

However, because the axial oscillation frequency is used for mass analysis in the orbitrap, and the axial frequency is not dependent on ion energy or radius (or linear velocity as the ions enter the orbitrap), the first and second fragment ion groups have the same axial frequency. As a result, they are still not resolved from one another in conventional mass analysis using the ideal E-field. Thus, using a calibration curve to determine the mass to charge ratio $M_N/Z_N$ of the precursor ions (from equation 2) may produce a wrong assignment of a given fragment ion to a precursor ion.

An aspect of the present invention provides a way to assign the fragment ions to their correct precursor ions. This is achieved by assessing differences in amplitudes of movement and energies of the ions in the orbitrap. This can be done by shifting the frequency of oscillation of one group relative to the other (although as noted above the frequency of axial oscillations in the orbitrap is normally independent of these parameters.) The "frequency shift" can be introduced by distorting the ideal electric field in the orbitrap in an appropriate manner. Preferably, the distortion is localised, for example, by applying a voltage to a (normally grounded) electrode disposed between, or near, outer detection electrodes.

It is preferable to charge the electrode to an extent that it distorts the electric field away from the hyper-logarithmic field so that the ions remain trapped, the ions amplitude of movement decays at a rate which does not prohibit efficient detection and the ideal field is distorted so that ions of different energies and/or a sufficient frequency shift is introduced between the two (or more) groups of fragment ions with the same $m_n/z_n$.

In a preferred embodiment, for trapped ions having energies of a few keV, a voltage is applied to the deflection electrode 200 to provide localised distortion 202 to the trap field. The voltage is typically between 20 to 250 volts, but may be higher or lower, depending on the energy of ions in the orbitrap. As a result, the detected axial frequency of ions oscillating relatively close to the distortion (that is, the group of fragment ions of $m_n/z_n$ which entered the orbitrap later resulting from the precursor ions of mass to charge ratio $M_B/Z_B$, these fragment ions having a larger orbit radius), is different from the fragment ions with the same $m_n/z_n$ oscillating further away from the distortion (that is, the group of fragment ions which entered the orbitrap at an earlier time, and derived from precursor ions of mass to charge ratio $M_A/Z_A$).

Figure 3:
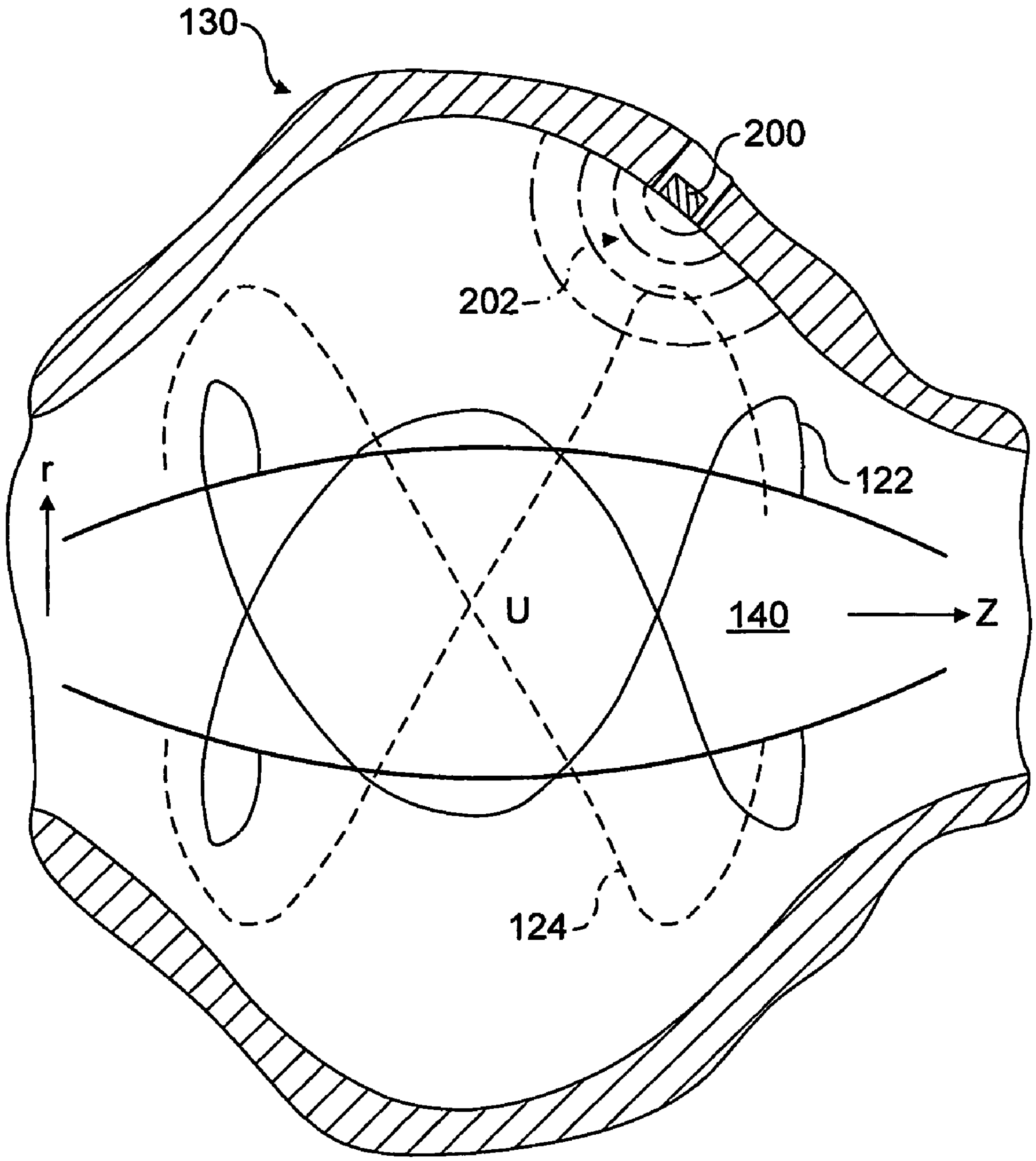
FIG. 3 is a schematic diagram showing the orbital paths of two ions having the same m/z, but different energy.

With reference to FIG. 3, a schematic diagram of the orbital paths 122, 124 of two ions in an orbitrap 130 are shown. Both the ions have the same mass to ratio; in the example outlined above, the two ions in FIG. 3 would be ions in the two groups of fragment ions each of mass to charge ratio $m_n/z_n$. but deriving from precursor ions of mass to charge ratio $M_A/Z_A$ and $M_B/Z_B$ respectively. Again, following the example above, the ion having a larger orbital radius (oscillation amplitude) 124 derives from precursor ions of mass to charge ratio $M_B/Z_B$, whereas the smaller orbit 122 is followed by the ion deriving from precursor ions of mass to charge $M_A/Z_A$. Their oscillation frequencies along the trap's longitudinal axis z are, however, the same when an ideal hyper-logarithmic field is applied to the ions, as discussed previously.

From FIG. 3, it can be seen that, when a voltage is applied to the deflection electrode 200, the electric field in its vicinity is distorted (as indicated at 202). Of course, the distortion is most intense close to the electrode and diminishes as the distance from the electrode increases. It can thus be seen that ions in the higher orbital path 124 experience the distorted field to a greater extent than ions in the lower orbital path 122. Hence, the axial oscillation frequency (and phase) of ions in the higher oscillation amplitude path is affected (and shifted) to a greater extent than oscillation frequencies of ions in lower oscillation amplitude orbital paths. Thus, the detected mass spectrum peaks for ions of the same mass to charge ratio $m_n/z_n$, but having different precursor ions of mass to charge ratios $M_A/Z_A$ and $M_B/Z_B$ respectively, are split into separated, resolvable peaks. Further, the initial phase of ions associated with each peak are resolvable.

Figure 4:
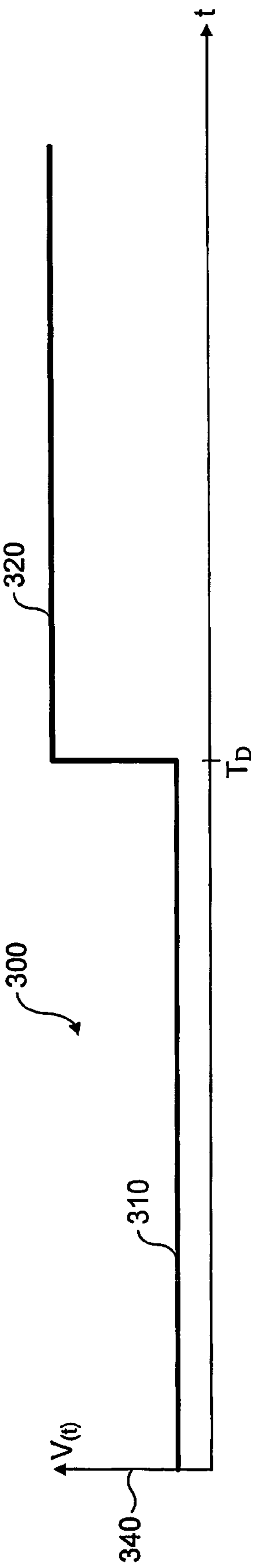
FIG. 4 is a schematic diagram showing the variation of voltage applied to an electrode over time.

With reference to FIG. 4, a voltage applied to the electrode used for introducing the electric field distortion in the electrostatic trap, with respect to time, is shown. The voltage has two distinct stages, a low voltage stage 310 and a high voltage stage 320. The step 330 at time $T_{step}$ between stage 1 and 2 is relatively rapid so that the electric field perturbations are introduced almost instantaneously. The voltage scale 340 in FIG. 4 only shows arbitrary values. The likely time required for each stage is preferably of the order of a few hundred milliseconds to a couple of thousand milliseconds for stage 1 and of the order of a few tens to a hundred milliseconds for stage 2. The transition between stage 1 and 2 should preferably be in the region of 10 microseconds, or so. The voltage applied to the electrode during stage 1 is chosen such that the electric field in the orbitrap is not distorted. Hence, if the electrode to which the distortion voltage is to be applied is disposed close to a normally grounded orbitrap electrode, then the initial voltage in stage 1 should also be ground, assuming the distortion electrode is on the same equi-potential as the detection electrode.

Figure 5:
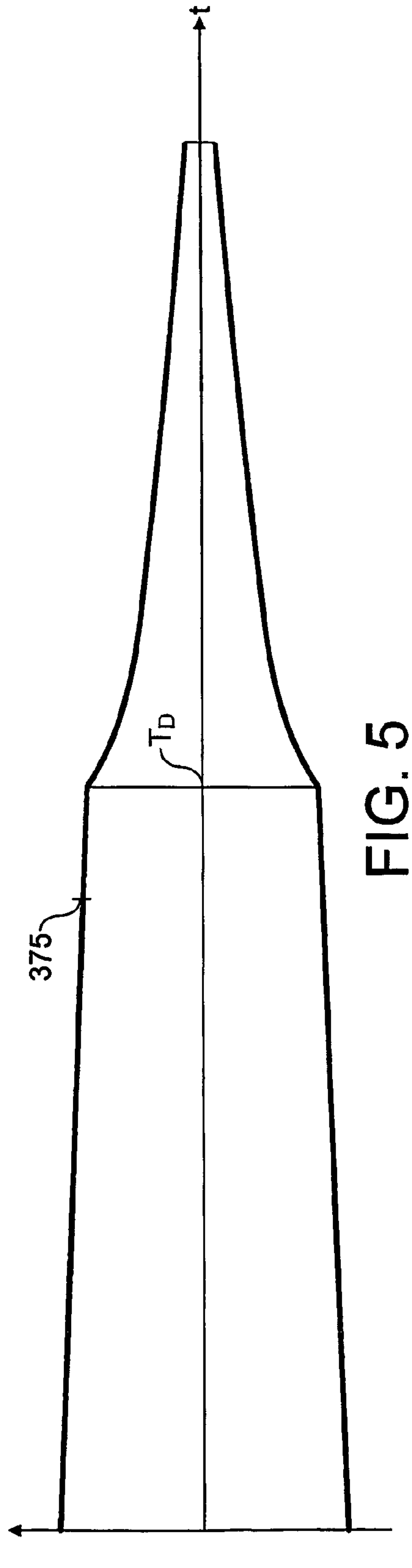
FIG. 5 is a schematic diagram showing the envelope of a detected transient ion in the orbitrap.

With reference to FIG. 5, the amplitude 375 of a group of ions in an orbit in the orbitrap (again, for consistency with the explanation so far, these would be fragmentations of mass to charge ratio $m_n/z_n$ is shown with respect to time. It can be seen that the amplitude decays relatively slowly when the ions are trapped by an ideal Electric field. However, the amplitude decays at a very much faster rate when the ideal field is distorted after $T_D$.

Figure 6:
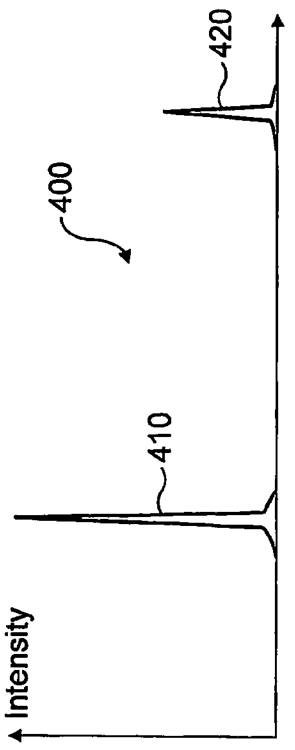
FIG. 6 is a schematic diagram of a mass spectrum acquired before $T_D$ using embodiments of the present invention.
Figure 7:
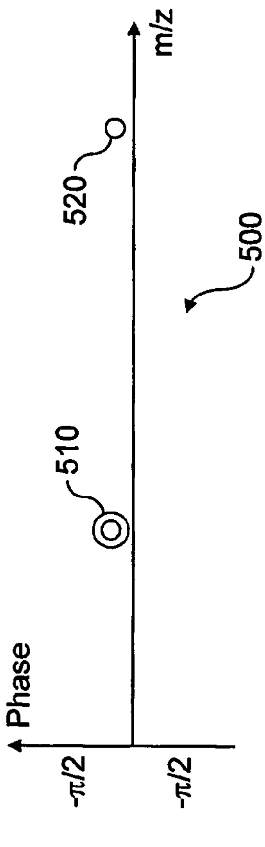
FIG. 7 is a schematic diagram showing a mass spectrum relating to the spectrum of FIG. 6, except that the phase of each peak detected is shown.

Referring to FIG. 6, a graph 400 of a mass spectrum resolved during stage 1 (that is, no field perturbation in the orbitrap) is shown. Two peaks 410 and 420 are shown, each having different intensities and different mass to charge ratios. With reference to the previous example and the labelling conventions defined there, these mass to charge ratios are for fragment ions, having mass to charge ratios $m_a/z_a$ and $m_b/z_b$ respectively. FIG. 7 shows a representation of the spectrum shown in FIG. 6 where the phase of the two peaks in FIG. 6 is shown against mass to charge ratio. The point 510 corresponds with peak 410 in FIG. 6 and the point 520 corresponds to peak 420 in FIG. 6.

Since the spectra shown in FIGS. 6 and 7 are taken during the first acquisition stage, it is not possible to deduce whether any of the points in these spectra genuinely represent a single bunch of fragment ions, or whether they in fact represent more than one bunch of fragment ions, having the same mass to charge ratio but being derived from different precursor ions of different mass to charge ratios $M_A/Z_A$ and $M_B/Z_B$ (which will not, in stage one, be resolvable since here the electric field is hyperlogarithmic). Expressed using the annotation as defined herein, the single peak 410 of FIG. 6 may be at $m_a/z_a$ as a result of fragments of that mass to charge ratio from a single precursor of mass to charge ratio $M_A/Z_A$ only, or it may instead be an unresolved peak representing fragment ions, all of mass to charge ratio $m_a/z_a$, but deriving from two or more precursor ions of mass to charge ratio $M_A/Z_A$; $M_B/Z_B$; $M_C/Z_C \ldots M_N/Z_N$.

Figure 8:
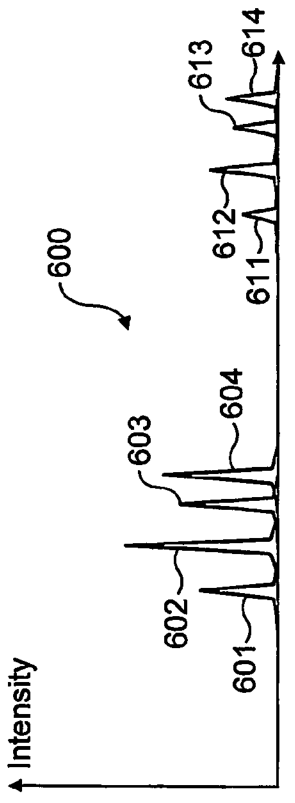
FIG. 8 is a mass spectrum acquired after $T_D$ using an embodiment of the present invention.

Referring to FIG. 8, a spectrum similar to that of FIG. 6 is shown. However, the spectrum 600 in FIG. 8 is taken during stage two, that is, when a voltage is applied to the electrode to distort the electric field in the electrostatic trap 130. The group of peaks 601 to 604 corresponds with the peak associated with 410 of the spectra taken during stage one. Likewise, the group of peaks made up of peaks 611 to 614 are associated with the peak 420 of the spectra taken during stage one. Thus, it can be seen that each of the peaks of the spectra taken in stage one (when the electric field in the electrostatic trap was homogeneous) is in fact revealed to be the unresolved consequence of a single mass to charge ratio $m_a/z_a$ in the case of peak 410, and $m_b/z_b$ in the case of peak 420), deriving in each case from not one but four precursor ion groups ($M_A/Z_A$; $M_B/Z_B$; $M_C/Z_C$ and $M_D/Z_D$ for peak 410, for example, and $M_E/Z_E$; $M_F/Z_F$; $M_G/Z_G$ and $M_H/Z_H$ for peak 420, perhaps).

Figure 9:
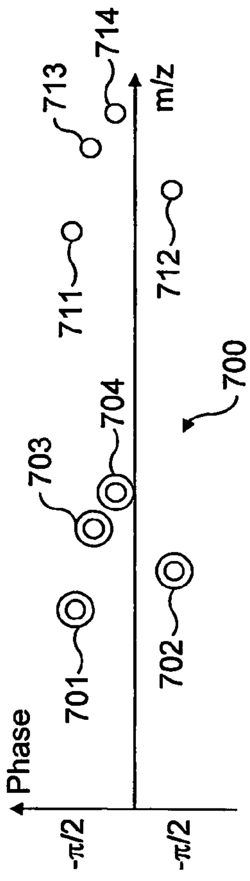
FIG. 9 is a schematic diagram showing the mass spectrum of FIG. 8, except that the phase of each peak detected is shown.

FIG. 9 corresponds with the spectrum shown in FIG. 8 but the phase of each of the peaks in FIG. 8 is shown. Points 710 to 714 and points 711 to 714 correspond to peaks 610 to 614 and 611 to 614 respectively. Thus, FIGS. 8 and 9, when compared with FIGS. 6 and 7 respectively, show how the non-homogeneous electrostatic field in the orbitrap can be used to "split" spectrum lines to reveal the different precursor ion mass to charge ratios responsible for a single mass to charge ratio fragmentation.

Faster signal decay and the resulting lower resolving power is expected due to the trap's inhomogeneous electric field, as shown in FIG. 5. The present method should allow the separation of fragmented or precursor ions whose mass-to-charge ratio are within a few percent of one another. If individual spectral peaks cannot be resolved then the corresponding fragment or precursor ion associated with the peaks can be flagged as unidentifiable.

It is preferable to acquire the data in two stages, as shown in FIG. 4. In stage one, the electrostatic field is maintained at an ideal state (or as close to this ideal as possible) so that the highest possible resolving power and mass accuracy are obtained from the spectrometer. During stage one, the masses are measured to a high accuracy and any possible isobaric interferences are also measured.

The system then switches to the second stage in which the electric field is perturbed by applying a voltage to an electrode close to one of the orbitrap electrodes. This perturbation causes spectral peaks to split and thus facilitates fragment assignment. Preferably, the second stage is much shorter than the first stage. Both stage one and two are preferably performed within a single spectrum acquisition.

The embodiments set out above are described with reference to electrostatic trap mass spectroscopy. However, the methods may be applicable to other forms of ion mass spectroscopy.

Variations of the apparatus and methods described above may also be envisaged by a person skilled in the art. For instance, it may be preferable to provide a dedicated electric field distortion electrode. This can be disposed on or off the orbitrap's equatorial axis. The electrode for distorting the electric field can be disposed at various locations in the orbitrap, some examples of which are shown in FIGS. 10 to 13.

Figure 10:
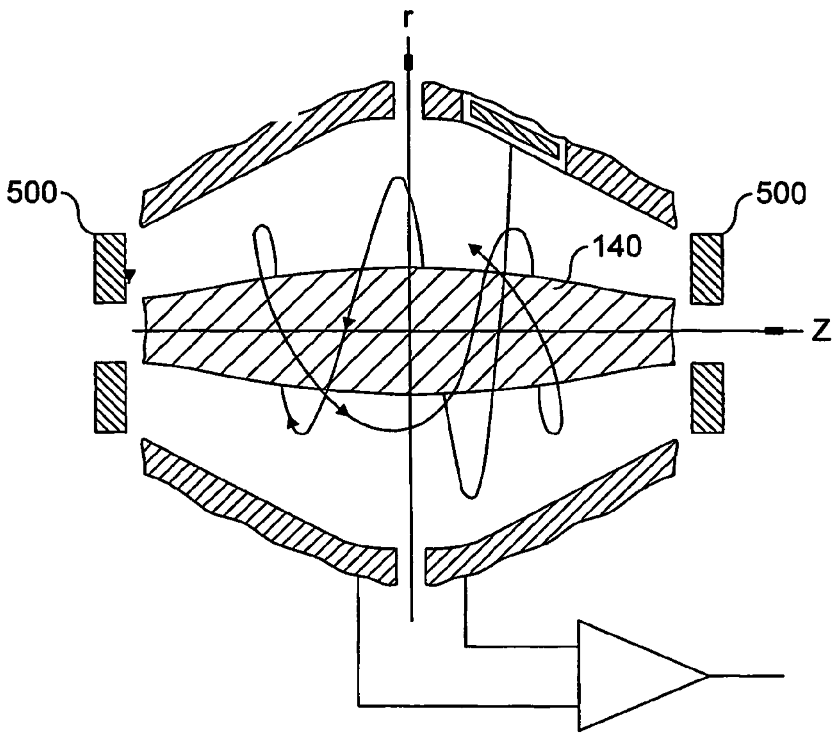
FIG. 10 to 13 each show various alternative arrangements of an electrostatic trap embodying the present invention.
Figure 11:
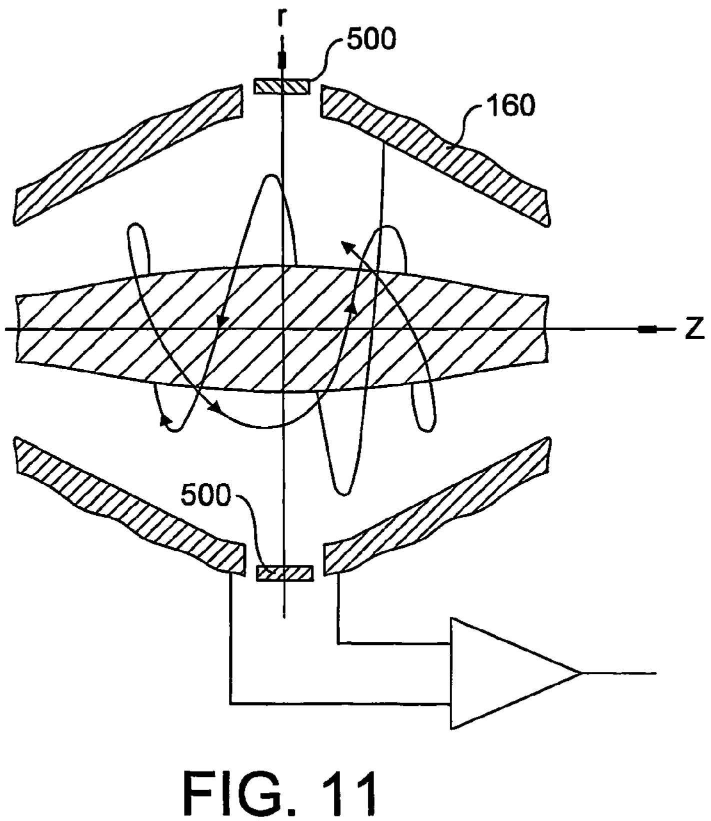
Figure 12:
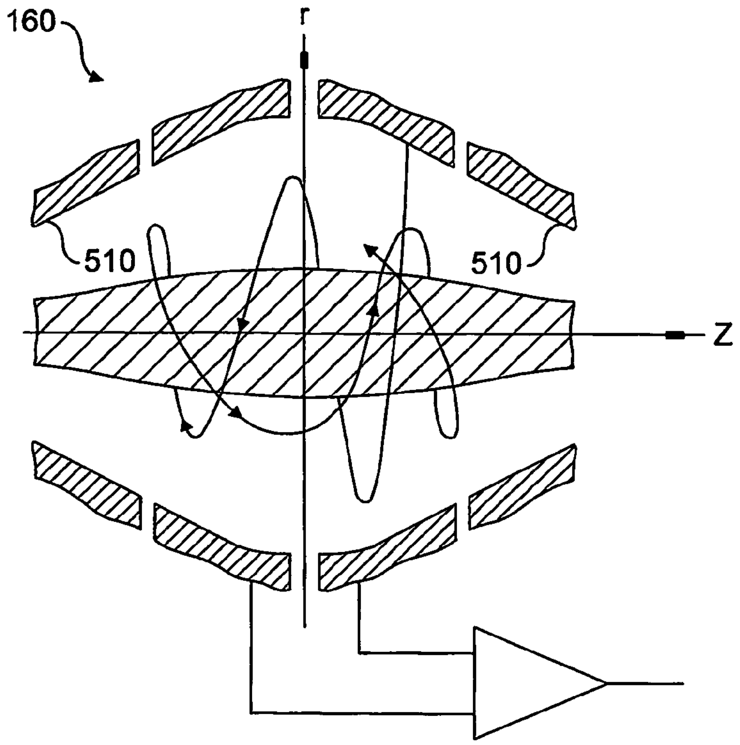
Figure 13:
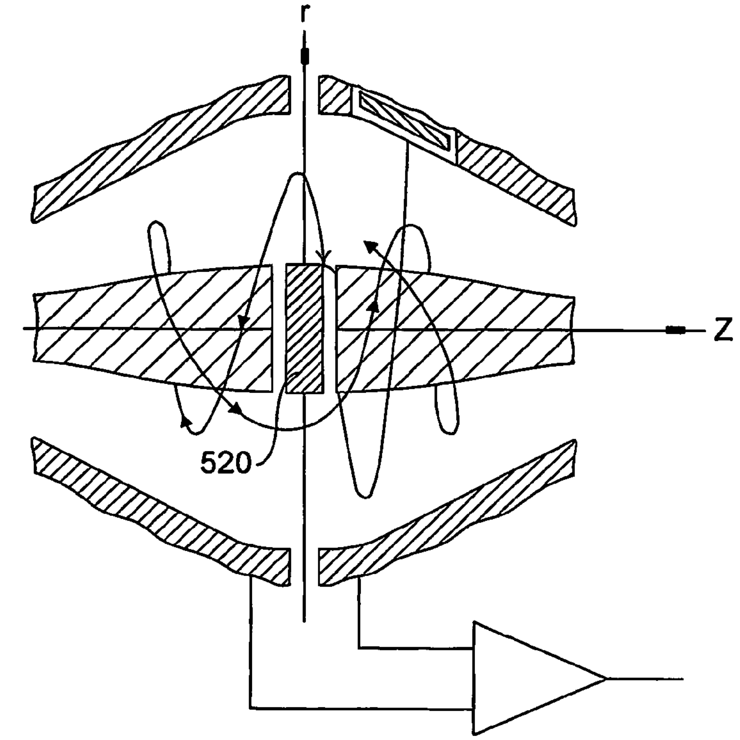

Referring to FIG. 10, the distorting electrode 500 is arranged as an annular ring electrode at either end of the central electrode 140. With reference to FIG. 11, the distortion electrode 500 is disposed as a radial ring about the centre of the outer electrode 160. With reference to FIG. 12, the outer electrode 160 is split into four parts comprising two inner and two outer electrodes. During stage one of a spectral acquisition, all of the outer electrode components can be arranged to operate at the same voltage to produce the ideal electric field. However, during stage two, a different voltage is applied to the two outermost electrodes 510 to distort the ideal field. The electric field distorting electrode 510 should be arranged so that axial oscillations of ions in the ideal field are generally within the inner edge of the distortion electrode. Of course, the distortion electrode may also be applied to the inner electrodes as well. Referring to FIG. 13, the distorting electrode 520 is disposed on the central electrode. In this example, the distorting electrode is shown at a central position, but it could also be arranged in any convenient location on the central electrode.

Other methods of distorting the electrostatic field will be apparent to skilled persons, other than the electrostatic distortion described above. For instance, resonant excitation of the ions by applying an RF voltage to the electrode would be used to provide a dependence of frequency on the ion's parameters.

Also, the foregoing description refers to TOF ion separation. However, the present invention is not limited to only this method and other forms of ion separation, such as ejection from a linear trap for instance, may be equally appropriate. For example, another embodiment of the present invention may include sequential ejection of precursor ions (which might have monotonously increasing or decreasing mass to charge ratios) towards the dissociation site. Thus, the $TOF_1$ term in equation 1 above is replaced with a scan dependent function. In practice, such a scan could be provided in different constructions of analytical linear traps, such as those described in U.S. Pat. No. 5,420,425 or WO00/73750.

The invention claimed is:

1. A method of mass spectrometry using an ion trap, the method comprising:

a) generating a plurality of precursor ions from a sample, each ion having a mass to charge ratio selected from a first range of mass to charge ratios $M_1/Z_1$, $M_2/Z_2$, $M_3/Z_3 \ldots M_N/Z_N$;

b) causing at least some of the plurality of precursor ions to dissociate, so as to generate a plurality of fragment ions, each of which has a mass to charge ratio selected from a second range of mass to charge ratios $m_1/z_1$, $m_2/z_2$, $m_3,z_3 \ldots m_n/z_n$;

c) directing the fragment ions into an ion trap, the ion trap including means for generating an electromagnetic field which allows trapping of ions in at least one direction thereof, the ions entering the trap in groups at a time which depends upon the mass to charge ratio of the precursor ions;

d) determining the mass to charge ratio of ions in at least one of the groups of ions, based upon a parameter of motion of the ions in that or those groups in the said electromagnetic field in the trap; and e) distorting the electromagnetic field in the trap so as to permit separate detection of fragment ions within the trap which have the same mass to charge ratio, but which are derived from different precursor ions.

2. The method according to claim 1, wherein:

the step of generating a plurality of fragment ions comprises generating, from a first group of precursor ions having a first mass to charge ratio $M_1/Z_1$ a first group of fragment ions having a mass to charge ratio $m_1/z_1$, and generating, from a second group of precursor ions having a second mass to charge ratio $M_2/Z_2$, a second group of fragment ions also having a mass to charge ratio $m_1/z_1$; and wherein the step of directing the plurality of fragment ions into the ion trap comprises directing the first and second groups of fragment ions, having the same mass to charge ratio $m_1/z_1$, into the ion trap, the groups arriving at the ion trap at difference times because $M_1/Z_1 \neq M_2/Z_2$.

3. The method of claim 2, wherein the step of generating an electromagnetic field comprises generating an axial ion trapping field in which ions oscillate in an axial direction of a potential well; and wherein the said parameter of motion employed to determine the mass to charge ratio of the ions is angular frequency, ω, the said angular frequency ω being dependent only upon the mass to charge ratio of ions within it, so that fragment ions within the ion trap having a mass to charge ratio $m_1/z_1$ oscillate at the same frequency ω, regardless of the parameters of the precursor ion from which they derive, prior to the said step of distorting the electromagnetic field.

4. The method of claim 3, wherein the step (e) of distorting the electromagnetic field comprises introducing a field component which causes the motion of the ions in the said potential well to become dependent upon at least one further parameter so that fragment ions having the same mass to charge ratio $m_1/z_1$, but deriving from different precursor ions become distinguishable as a consequence of the dependence of each separate group of fragment ions upon the said at least one further parameter.

5. The method of claim 4, wherein the at least one further parameter includes a parameter selected from the list comprising amplitude of motion in at least one direction of the trap; frequency of motion; the phase of a group in the trap; and the energy of ions in a group in the trap.

6. The method of claim 1, wherein the ion trap is an electrostatic trap, and wherein the step of generating an electromagnetic field therein comprises generating a substantially hyperlogarithmic field.

7. The method of claim 1, wherein the step (e) of distorting the electric field comprises applying an additional local distortion to the electric field, such that ions approaching the local distortions distant from the local distortion within the trap experience a substantially undistorted field.

8. The method of claim 7, wherein the electrostatic trap further comprises a distortion electrode, the method further comprising applying a voltage to the distortion electrode so as to cause the said distortion of the electromagnetic field.

9. The method of claim 8 further comprising applying the distortion voltage to the distortion electrode after a predetermined time has elapsed following the injection of ions into the ion trap.

10. The method of claim 1, wherein the mass spectrum is obtained in two stages: in a first stage, the trap electromagnetic field is undistorted, and in a second stage, the electromagnetic field is distorted so that fragment ions having the same mass to charge ratio, $m_1/z_1$, but which are derived from precursor ions with different mass to charge ratios $M_1/Z_1$, $M_2/M_2$ can be distinguished from one another.

11. The method of claim 10, wherein the second phase commences after a predetermined period.

12. The method of claim 1, wherein the step (b) of causing at least some of the precursor ions to dissociate includes a technique selected from the list comprising surface induced dissociation (SID), collision induced dissociation (CID), and photon induced dissociation (PID).

13. The method of claim 12, wherein the step (b) of causing at least some precursor ions to dissociate is through SID, the method further comprising applying a retarding voltage to a collision surface.

14. The method of claim 13, wherein there is provided a collision surface, the collision surface being arranged in a reflection geometry.

15. A mass spectrometer comprising:

an ion source, arranged to supply a plurality of sample ions to be analysed;

means for directing the sample ions towards a dissociation location, the sample ions arriving at the said dissociation location as a plurality of groups of precursor ions in accordance with their mass to charge ratios selected from the range $M_1/Z_1$, $M_2/Z_2$, $M_3/Z_3 \ldots M_N/Z_N$;

an ion trap having a trap entrance, the ion trap being arranged to receive groups of fragment ions generated by dissociation of the precursor ions at the dissociation location, each group of fragment ions having a mass to charge ratio selected from the range $m_1/z_1$, $m_2/z_2$, $m_3/z_3 \ldots m_n/z_n$, the ion trap further comprising trap electrodes configured to generate a trapping field within the ion trap, so that unfragmented precursor ions and/or fragment ions entering the trap are trapped in at least one axial direction thereof by the said trapping field and have a parameter of movement related solely to the mass to charge ratio of the ion;

detection means to permit determination of the mass to charge ratio of an ion group based upon the said parameter of movement; and at least one electric field distorting electrode arranged to provide a distortion of the trapping field so as to permit the detection means to detect separate groups of fragment ions in the ion trap which have the same mass to charge ratio, $m_1/z_1$, but which have derived from precursor ions having at least two different mass to charge ratios $M_1/Z_1$, $M_2/Z_2$.

* * * * *